N. WRIGHT.
Valve-Motions.

No. 150,384. Patented April 28, 1874.

Witnesses:
Michael Ryan
Fred Hayne

Nelson Wright
by his Attorneys
Brown & Allen

UNITED STATES PATENT OFFICE.

NELSON WRIGHT, OF NEWARK, NEW JERSEY.

IMPROVEMENT IN VALVE-MOTIONS.

Specification forming part of Letters Patent No. 150,384, dated April 28, 1874; application filed March 13, 1874.

*To all whom it may concern:*

Be it known that I, NELSON WRIGHT, of the city of Newark, in the county of Essex and State of New Jersey, have invented an Improvement in Valve-Motions Applicable to Rotary Meters or Motors and other purposes, of which the following is a specification:

This invention consists in a combination, with one or more ball-valves, of a corresponding number of mechanical lifters applied to directly act upon said valves to raise them from their seats when it is required to open them, but leaving the valves free to drop and adjust themselves to their seats.

Figure 1:
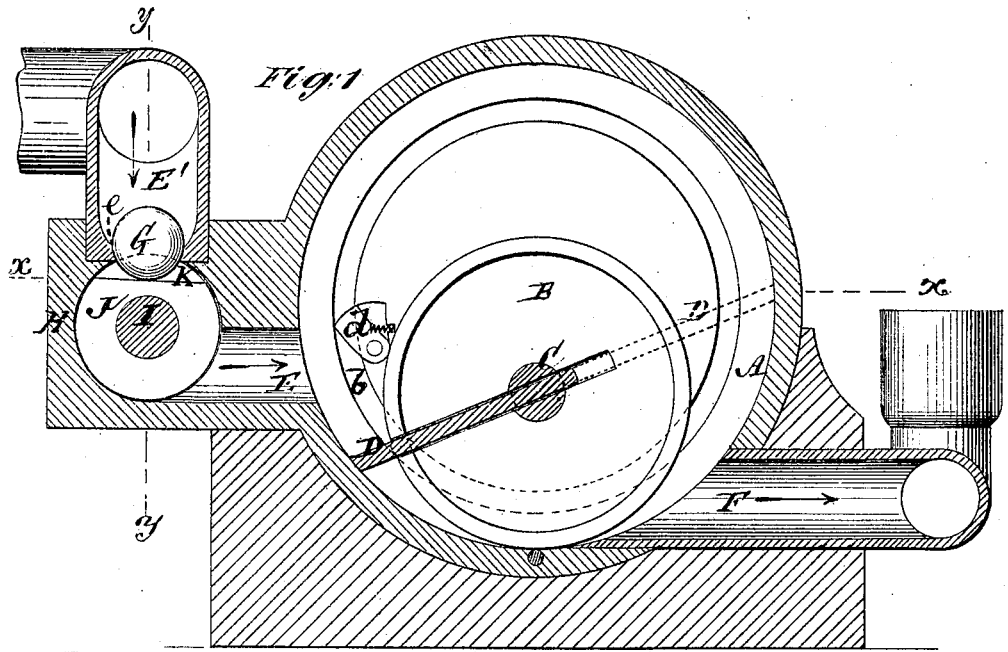
Figure 2:
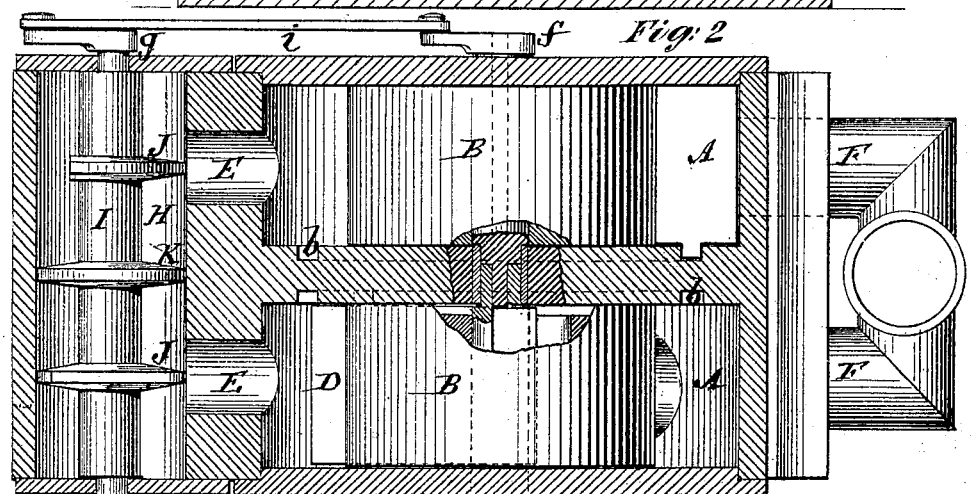
Figure 3:
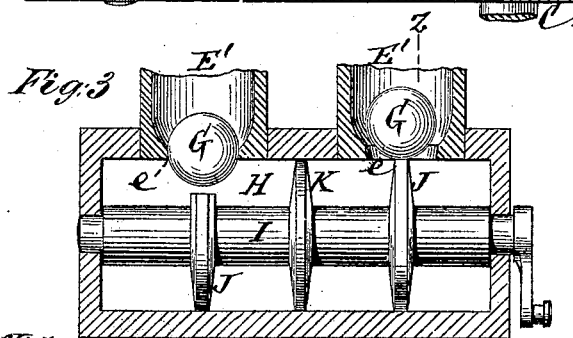
Figure 4:
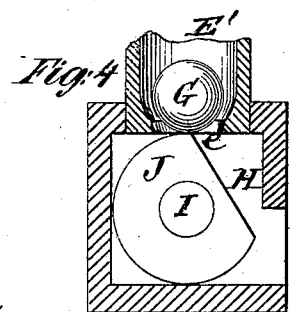

In the accompanying drawing, Figure 1 represents a vertical section transversely through the axis of the cylinder of a liquid rotary meter with my improvement in valves or valve-motions applied thereto. Fig. 2 is a horizontal section on the line $x\ x$; Fig. 3, a vertical section on the line $y\ y$; and Fig. 4, a section at right angles to Fig. 3, on the line $z\ z$.

Similar letters of reference indicate corresponding parts.

The meter or motor to which my improvement is here shown applied is of a rotary description, consisting of two separate cylinders or chambers, A A, arranged side by side, and within which are two revolving hubs, B B, connected with the same main shaft C, and eccentrically disposed, so that they work in contact with the lowest interior surfaces of the cylinders. These revolving hubs are each fitted with a radially-sliding piston, D, so arranged in relation the one with the other, and with the inlet and outlet passages E E and F F, that a continuous and equable action is kept up, and the radially-sliding pistons being worked in and out by a stud on their edges, fitting grooves $b\ b$ in the cylinders, which grooves may be closed, to prevent leakage, by spring-gates $d$, that are moved out of the way by the studs on the pistons when the latter pass them. Such meter or motor requires duplicate inlet-valves G G, made to open and close in succession. These valves are loose balls or globes arranged to move freely within inlet-passages E' E', and closing seats or openings $e\ e$ of a receiving chamber or chest, H. Said valves are self closing and adjusting, and in these respects have the same freedom as any ball-valve, and are superior to puppet-valves on many accounts; but they are opened by mechanical means or lifters precisely at the time required, and to the necessary extent, by the direct action of the lifters on their under surfaces against a superior pressure of the fluid above them. Unlike mechanically-operated puppet-valves, these valves G G have no stems working through stuffing-boxes, which, apart from their liability to leakage, restrict the free closing of the valves; and in the case of duplicate valves, as here shown, or in fact any number of valves more than one, operating in succession at specified intervals, and in proper or timely relation with each other, the same mechanical lifter, as a whole, may be used for all the valves. Thus, in the drawing, I is a single rock-shaft, arranged within the chamber H, and deriving its motion by cranks $f\ g$, and a connecting-rod, $i$, from the main shaft C. On this rock-shaft I, directly under the valves G G, are cams J J, which may be simple disks having a portion of their peripheries cut away at suitable points relatively with each other, so that as the shaft I is rocked, said disks alternately serve to lift, by their cut-away portions, the ball-valves G G, and to allow of the valves in due course dropping to their seats. A diaphragm, K, on the rock-shaft I serves to divide the inlet-chamber H into separate compartments, to provide for the proper action of the valves as regards their alternate control of the supply. This forms a very simple and efficient mechanical lifter of the valves; but others might be substituted for it, and the purposes to which my improvement in valve-motions may be applied are numerous.

I claim—

1. The combination, with one or more ball-valves, of one or more mechanical lifters applied to act on the under surfaces of said valves to raise them, but leaving the valves free to drop and to adjust themselves to their seats, substantially as specified.

2. The combination, with the ball-valves G G, of the shaft I and cams J J, arranged for operation, in relation with each other and the valves, essentially as shown and described.

NELSON WRIGHT.

Witnesses:
MICHAEL RYAN,
VERNON H. HARRIS.